US006612649B2

(12) United States Patent  (10) Patent No.: US 6,612,649 B2
Kain  (45) Date of Patent: Sep. 2, 2003

(54) JUVENILE VEHICLE SEAT CUP HOLDER

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/377,653

(22) Filed: Mar. 4, 2003

(65) Prior Publication Data

US 2003/0137168 A1 Jul. 24, 2003

Related U.S. Application Data

(63) Continuation of application No. 09/881,503, filed on Jun. 14, 2001, now Pat. No. 6,550,862.

(51) Int. Cl.$^7$ ................................................. A47C 1/08
(52) U.S. Cl. ........................ 297/250.1; 297/188.11; 297/188.21; 297/256.16
(58) Field of Search ..................... 297/250.1, 188.11, 297/188.01, 188.21, 252, 256.16; 224/275

(56) References Cited

U.S. PATENT DOCUMENTS

| | | | |
|---|---|---|---|
| 2,635,680 A | 4/1953 | Zentmire | |
| 3,637,184 A | 1/1972 | O'Brien | |
| 4,434,961 A | 3/1984 | Hoye | |
| 4,527,830 A | 7/1985 | Meyers | |
| 4,715,652 A | 12/1987 | Ward | |
| 4,733,908 A | 3/1988 | Dykstra et al. | |
| 4,759,584 A | 7/1988 | Dykstra et al. | |
| 4,799,731 A | 1/1989 | Brown | |
| 4,818,017 A | 4/1989 | Dykstra et al. | |
| 4,828,211 A | 5/1989 | McConnell et al. | |
| 4,927,200 A | 5/1990 | Wilkins | |
| 4,942,827 A | 7/1990 | Norgaard | |
| 4,943,111 A | 7/1990 | VanderLaan | |
| 4,951,997 A | 8/1990 | Kenney | |
| 5,007,610 A | 4/1991 | Christiansen et al. | |
| 5,035,464 A | 7/1991 | Spallholtz | |
| 5,072,909 A | 12/1991 | Huang | |
| 5,131,716 A | 7/1992 | Kwasnik et al. | |
| 5,150,946 A | 9/1992 | Marfilius et al. | |
| 5,248,183 A | 9/1993 | Gignac | |
| 5,286,084 A | 2/1994 | Bart | |
| 5,289,962 A | 3/1994 | Tull et al. | |
| 5,332,286 A | 7/1994 | Atherton et al. | |
| 5,494,249 A | 2/1996 | Ozark et al. | |
| 5,524,957 A | 6/1996 | Gibriano | |
| 5,586,806 A | 12/1996 | Hergott | |
| 5,615,925 A | 4/1997 | Kain | |
| 5,618,018 A | 4/1997 | Baniak | |
| 5,628,486 A | 5/1997 | Rossman et al. | |
| 5,685,604 A | 11/1997 | Kain | |
| 5,746,363 A | 5/1998 | Teller et al. | |
| 5,788,324 A | 8/1998 | Shea et al. | |
| 5,947,554 A | 9/1999 | Mashkevich | |
| 5,964,502 A | 10/1999 | Stephens | |
| 6,019,334 A | 2/2000 | Shinomiya | |
| 6,065,729 A | 5/2000 | Anderson | |
| 6,105,917 A | 8/2000 | Yabuya et al. | |
| 6,142,574 A | 11/2000 | Alexander | |
| 6,220,660 B1 | 4/2001 | Bedro et al. | |
| 6,250,527 B1 | 6/2001 | Mizue et al. | |
| 6,253,975 B1 | 7/2001 | Ichioka et al. | |
| 6,264,273 B1 | 7/2001 | Waters, Sr. | |
| 6,343,837 B1 | 2/2002 | Gage | |

Primary Examiner—Milton Nelson, Jr.
(74) Attorney, Agent, or Firm—Barnes & Thornburg

(57) ABSTRACT

A juvenile vehicle seat is provided including a cup holder. The cup holder is movable between a retracted position adjacent the seat and an extended position spaced from the seat.

15 Claims, 3 Drawing Sheets

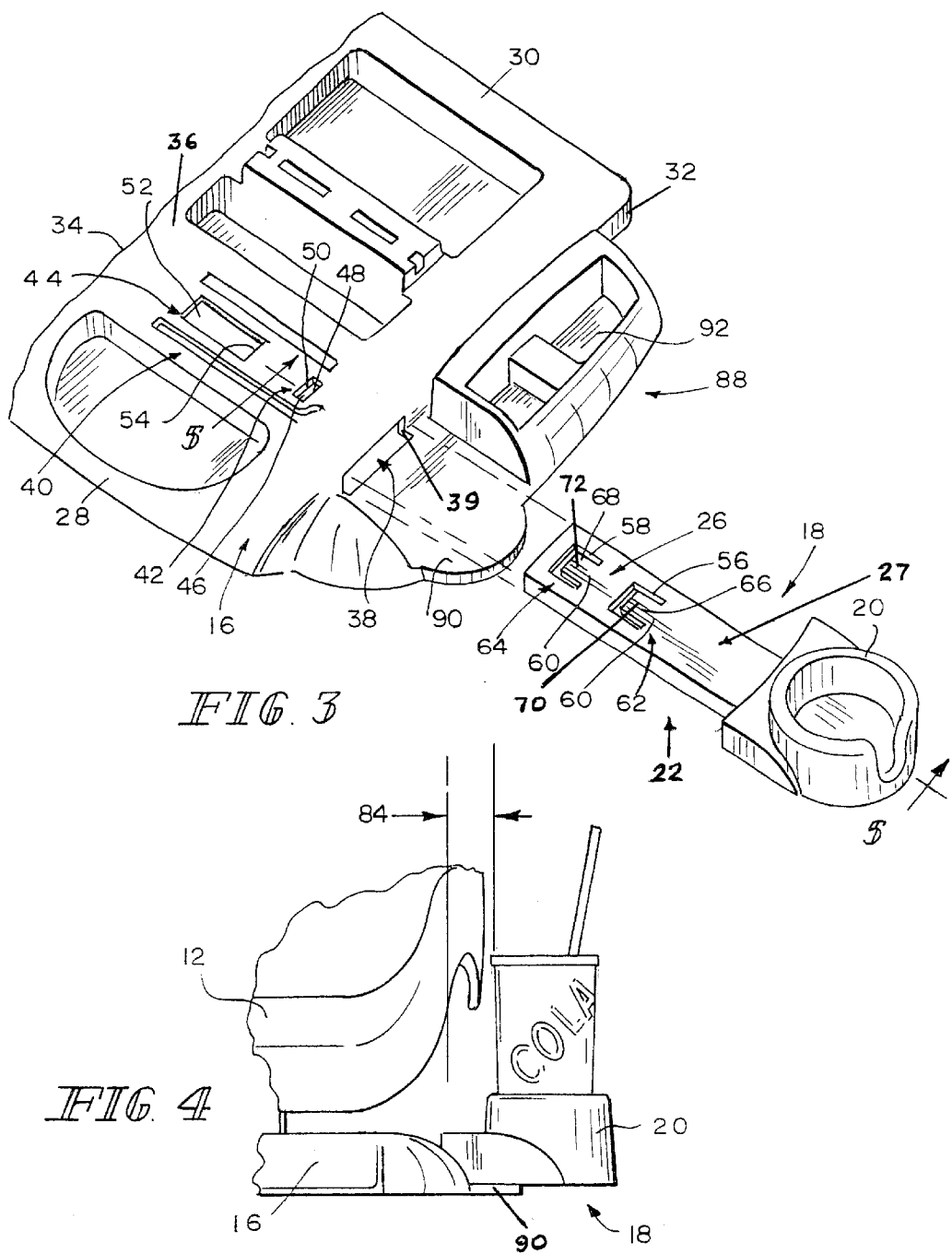

JUVENILE VEHICLE SEAT CUP HOLDER

CROSS-REFERENCE TO RELATED APPLICATIONS

This application is a continuation of U.S. application Ser. No. 09/881,503 filed Jun. 14, 2001, now U.S. Pat. No. 6,550,862.

BACKGROUND AND SUMMAEY

The present application relates to a juvenile vehicle seat and particularly to a juvenile vehicle seat having a cup holder movable between a retracted position and an extended position.

Conventional juvenile vehicle seats are generally known and are in relatively widespread use. It is desirable to provide a juvenile vehicle seat including a cup holder movable between a retracted position and an extended position.

According to the present disclosure, a juvenile vehicle seat is provided including a seat bottom and a seat back and a cup holder movable relative to the seat bottom. The cup holder is movable between a retracted position adjacent the seat bottom and an extended position spaced from the seat bottom.

In an illustrative embodiment, the cup holder includes a cup retainer or article receiver coupled to a connector or connecting member. A first portion of the connector cooperates with a second portion of the seat bottom or a base for the seat bottom to inhibit movement of the cup holder from at least one of the retracted and extended positions.

In another illustrative embodiment, the juvenile vehicle seat base is configured to releasably couple to the seat bottom. The base provides a receptor or aperture to receive the connector. The base includes engagement edges that cooperate with the connector to inhibit movement of the cup holder from at least one of the retracted and extended positions.

In another illustrative embodiment, the connector provides surfaces to engage the engagement edges of the base. One or more flexible tabs provide the surfaces so that when a user applies sufficient force to move the cup holder toward the extended position or the retracted position the tabs flex to disengage the surfaces from the edges. The tabs and surfaces thereon are configured to cooperate with the base or seat bottom to inhibit movement of the cup holder until a deliberate and sufficient force is applied to move the cup holder.

In still another illustrative embodiment, while in the retracted position, the cup holder is spaced apart from the seat bottom by a first distance. In the extended position the cup holder is spaced apart from the seat bottom by a second distance. The second distance is greater than the first distance. The second distance is sufficient so that the cup holder, when in the extended position, can accommodate cups or other articles having dimensions that would not be accommodated by the cup holder in the retracted position.

Additional objects, features, and advantages of the present application will become apparent to those of ordinary skill in the art upon consideration of the following detailed description of preferred embodiments exemplifying the best mode of carrying out the subject matter of this application as presently perceived.

BRIEF DESCRIPTION OF THE DRAWINGS

The detailed description particularly refers to the accompanying figures in which:

FIG. 3 is a perspective view of a portion of the juvenile vehicle seat of FIG. 1 showing the cup holder positioned for assembly;

FIG. 4 is a front view of a portion of the juvenile vehicle seat of FIG. 1 showing the cup holder in the extended position;

DETAILED DESCRIPTION OF THE PEEFERRED EMBODIMENTS

Figure 1:
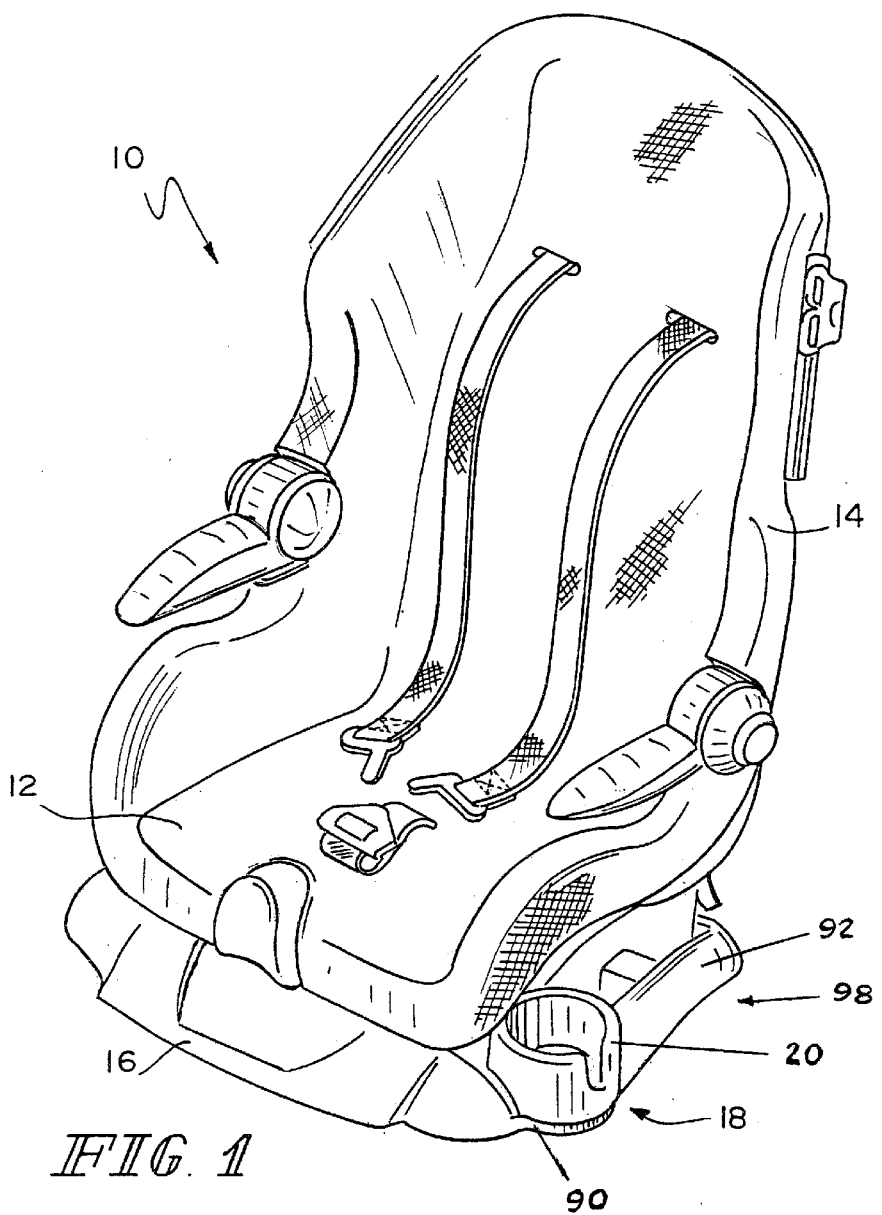
FIG. 1 is a perspective view of a juvenile vehicle seat having a seat back, a seat bottom coupled to the seat back, a base coupled to the seat bottom, and a movable cup holder engaging the base.
Figure 2:
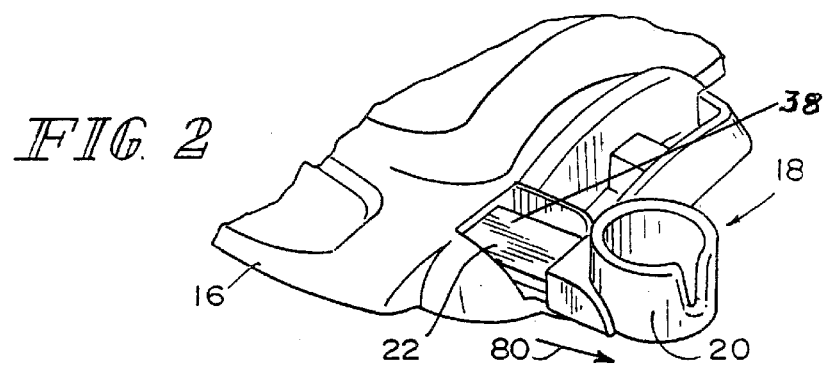
FIG. 2 is a perspective view of a portion of the juvenile vehicle seat of FIG. 1 showing the cup holder in an extended position.

Juvenile vehicle seat assembly 10 includes a seat 12, 14, a base 16, and a cupholder 18 as shown in FIG. 1. Base 16 is arranged to support seat 12, 14 and formed to include a cupholder receptor 38 and first, second, and third engagement surfaces 48, 50, 54 as shown in FIGS. 2 and 3. First, second, and third engagement surfaces 48, 50, 54 are arranged to lie in spaced-apart parallel relation to one another as shown in FIG. 3. Second engagement surface 50 is positioned to lie between the first and third engagement surfaces 48, 54 as shown in FIG. 5.

Figure 5:
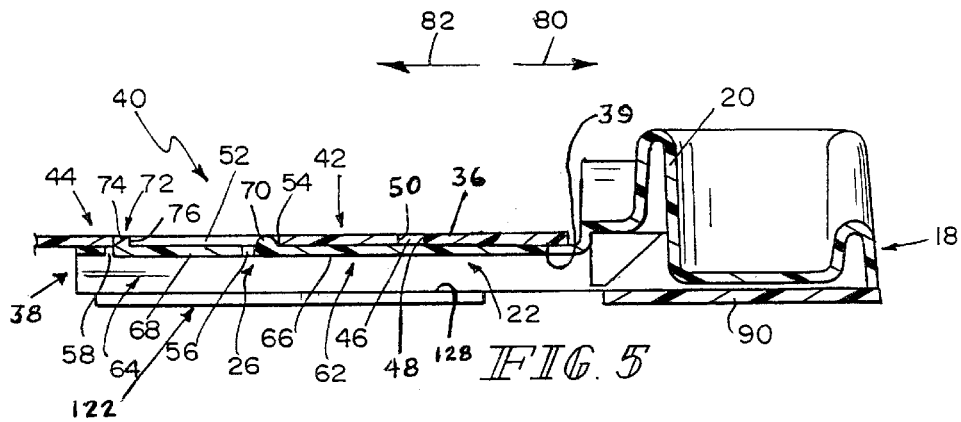
FIG. 5 is a sectional view of the juvenile vehicle seat of FIG. 1 taken along line 5—5 of FIG. 3 showing the cup holder in a retracted position, showing the connector engaging the base.
Figure 7:
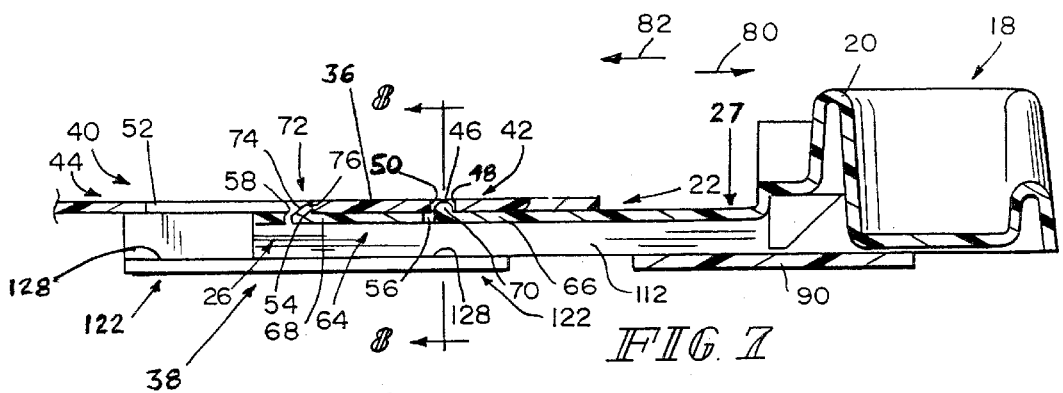
FIG. 7 is a sectional view similar to FIG. 5 showing the cup holder in the extended position.
Figure 8:
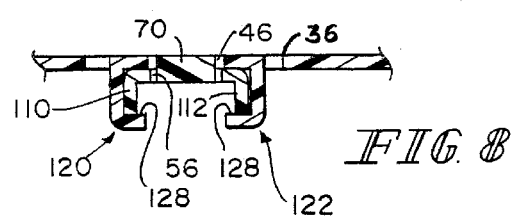
FIG. 8 is a sectional view of a portion of the juvenile vehicle seat of FIG. 1 taken along line 8—8 of FIG. 7.

Cupholder 18 is mounted for movement relative to base 16 between a retracted position shown in FIG. 5 and an extended position shown in FIG. 7. Cupholder 18 includes a cup receiver 20 and a base connector 22 coupled to cup receiver 20 and arranged to extend into cupholder receptor 38 formed in base 16 as suggested in FIGS. 1–3. Base connector 22 including a first retainer 62 arranged to confront first and second engagement surfaces 48, 50 upon movement of cupholder 18 to the extended position to inhibit movement of cupholder 18 relative to base 16 and away from the extended position as shown in FIG. 7. First retainer 62 is also arranged to confront third engagement surface 54 upon movement of cupholder 18 to the retracted position to inhibit movement of cupholder 18 relative to base 16 and toward the extended position.

As shown in FIG. 3, base 16 includes a front 28, a rear 30, and a pair of side walls 32, 34. Base 16 further includes means (not shown) for coupling seat bottom 12 to the base. Side wall 32 of base 16 is formed to include an opening 39 into a cupholder receptor 38 formed in base 16 to receive base connector 22 of cup holder 18 and permit sliding movement of base connector 22 relative to base 16. Although certain embodiments are disclosed herein as including base 16, it is within the scope of this disclosure to incorporate the features described herein as being part of base 16 into the seat bottom 12 or other portion of juvenile vehicle seat 10.

Figure 6:
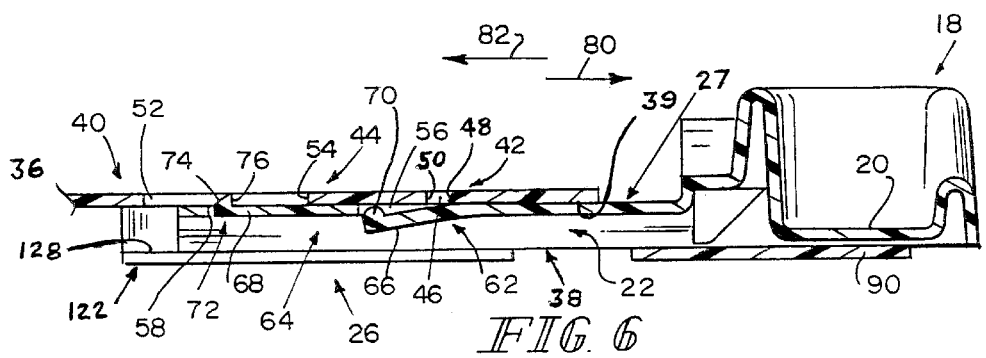
FIG. 6 is a sectional view of the juvenile vehicle seat similar to FIG. 5 showing the cup holder in a position between the retracted and extended positions.

Base 16 includes a deck 36 formed to include first, second, and third engagement surfaces 48, 50, 54 and to define a ceiling of cupholder receptor 38 as shown in FIGS. 5–7. Base connector 22 includes a retainer mount portion 26 that is arranged to lie under deck 36 and a neck portion 27 that is arranged to interconnect retainer mount portion 26 and the cup receiver 20 as shown in FIGS. 3 and 6. Retainer means 62, 64 is coupled to base connector 22 for contacting base 16 to inhibit movement of cupholder 18 relative to base 16 between the retracted position and extended position as suggested in FIGS. 5–7. Retainer means 62, 64 includes first retainer 62 and second retainer 64 as shown in FIG. 3.

First retainer 62 is coupled to retainer mount portion 26 as shown in FIG. 3. First retainer 62 is arranged to extend upwardly toward deck 36 to confront first and second engagement surfaces 48, 50 upon movement of cupholder 18 to the extended position and to confront third engagement surface 54 upon movement of cupholder 18 to the retracted position.

Deck 36 is formed to include a first opening 46 defined in part by first and second engagement surfaces 48, 50 and sized to receive therein a portion 70 , e.g. a detent, of first retainer 62 upon movement of cupholder 18 to the extended position. Deck 36 is also formed to include a second opening 52 defined in part by third engagement surface 54 and sized to receive therein the detent 70 of the first retainer 62 upon movement of cupholder 18 to the retracted position as shown in FIG. 5. Detent 70 has a curved surface arranged to confront first and second engagement surfaces 48, 50 upon movement of cupholder 18 to the extended position and to confront third engagement surface 54 upon movement of cupholder 18 to the retracted position.

First retainer 62 includes a flexible first tab 66 cantilevered to retainer mount portion 26 of base connector 22 to move up and down relative to deck 36 and detent 70 is appended to flexible first tab 66 to move up and down therewith. Detent 70 is sized to extend into first opening 46 to confront first and second engagement surfaces 48, 50 upon movement of cupholder 18 to the extended position and to extend into second opening 52 to confront third engagement surface 54 upon movement of cupholder 18 to the retracted position. Flexible first tab 66 provides means for moving detent 70 in an upward direction into second opening 52 to confront third engagement surface 54 upon movement of cupholder 18 to the retracted position as suggested in FIGS. 5 and 6.

Base connector 22 further includes a second retainer 64 arranged to confront third engagement surface 54 upon movement of cupholder 18 to the extended position to inhibit further movement of cupholder 18 relative to base 16 away from the retracted position so as to block movement of cupholder 18 to a withdrawn position outside of cupholder receptor 38 formed in base 16. Second retainer 64 is coupled to retainer mount portion 26 to cause first retainer 62 to lie between neck portion 27 and second retainer 64. Second retainer 64 is arranged to extend upwardly toward deck 36 to confront third engagement surface 54 upon movement of cupholder 18 to the extended position as shown in FIG. 7 and to lie in spaced-apart relation to third engagement surface 54 upon movement of cupholder 18 to the retracted position as shown in FIG. 5.

Second retainer 64 includes a flexible second tab 68 cantilevered to retainer mount portion 26 of the base connector 22 to move up and down relative to deck 36 and a catch 72 appended to flexible second tab 68 to move up and down therewith. Catch 72 is sized to extend into the second opening 52 to confront third engagement surface 54 upon movement of cupholder 18 to the extended position.

Catch 72 has a vertical stop surface 76 arranged to contact third engagement surface 54 to inhibit removal of cupholder 18 from cupholder receptor 38 formed in base 16. Catch 72 also includes a sloped surface 74 arranged to cam on second engagement surface 50 to bend flexible second tab 68 downwardly to move catch 72 relative to deck 36 and away from second engagement surface 50 during initial insertion of base connector 22 into cupholder receptor 38 and movement of cupholder 18 relative to base 16 toward the retracted position. Catch 72 is positioned to lie in second opening 52 in spaced-apart relation to third engagement surface 54 upon movement of cupholder 18 to the retracted position.

Base 16 further includes a platform 90 located under a portion of the cupholder 18 and a side wall 32 is located between deck 36 and platform 90. Side wall 32 is formed to include side opening 39 and cooperate with deck 36 to form cupholder receptor 38 under deck 36 to receive base connector 22 through the side opening 39 as suggested in FIG. 3. Cupholder 18 is arranged to move along a path above platform 90 during movement of cupholder 18 between the retracted and extended positions as shown in FIGS. 5–7.

Base 16 further includes left and right guide supports 120, 122 located in cupholder receptor 38 under deck 36 and arranged to support a portion of cupholder 18 for sliding movement relative to base 16 during movement of cupholder 18 between the retracted and extended positions. Platform 90 is arranged to lie outside of cupholder receptor 38 formed in base 16 to support another portion of cupholder 18 for sliding movement relative to base 16 during movement of cupholder 18 between the retracted and extended positions.

Referring now to FIGS. 4–7, first portion 26 of base connector 22 is configured to cooperate with a second portion 40 of base 16. Second portion 40 includes first and second retainer engaging portions 42, 44 for engaging base connector 22. Illustratively, first retainer engaging portion 42 provides a first opening or notch 46 providing engagement edges or surfaces 48, 50 that cooperate with base connector 22 to inhibit movement of cup holder 18 from the extended position. Second retainer engaging portion 44 provides a second opening 52 providing a third engagement edge or surface 54 to cooperate with base connector 22 to inhibit movement of cup holder 18 from the retracted position and to inhibit removal of cup holder 18 from base 16. Although in illustrative embodiments base 16 includes first and second retainer engaging portions 42, 44, a single retainer engaging portion inhibiting movement of the cup holder 18 is within the scope of this disclosure. Additionally, although retainer engaging portions 42, 44 have been illustrated as including first and second openings 46, 52 providing engagement edges 48, 50, 54, other known structures cooperating with base connector 22 to inhibit movement of cup holder 18 are within the scope of this disclosure. For example, cup holder 18 could include a structure to interact with the seat bottom or base to provide friction or other forms of contact to inhibit movement of the cup holder.

As shown in FIG. 3, base connector 22 provides first and second openings 56, 58 each providing a connection edge 60. First portion 26 of base connector 22 includes first and second retainers 62, 64 having first and second tabs 66, 68 respectively, each tab being cantilevered to one of connection edges 60. As shown in FIGS. 5–7, first tab 66 provides a detent 70. Illustratively, detent 70 has a curved surface. Also as shown in FIGS. 5–7, second tab 68 provides a catch 72 having a sloped surface 74 and a stop surface 76.

As shown in FIG. 4, when cup holder 18 is in the extended position, cup receiver 20 is spaced apart from base 16 and seat bottom 12 by a distance 84 greater than when cup holder 18 is in the retracted position. In an illustrative embodiment, distance 84 is about two inches. However, it is within the scope of this disclosure for distance 84 to be other lengths. Distance 84 is illustratively sufficient in length so that cup receiver 20, when in the extended position, can accommodate cups or other articles having dimensions that would not be accommodated by the cup holder 18 in the retracted position.

In the retracted position shown in FIG. 5, cup receiver 20 is proximate or adjacent side 32 of base 16. In this position, catch 72 and detent 70 are positioned in second opening 52. When a user applies force to cup holder 18 in a direction 80, detent 70 engages third engagement edge 54 of opening 52 to inhibit movement of cup holder 18 from the retracted position toward the extended position.

Referring to FIG. 6, as a user applies a force sufficient to move cup holder 18 in direction 80 from the retracted position toward the extended position, the curved surface of detent 70 moves against third engagement edge 54 until first tab 66 flexes and detent 70 disengages third engagement edge 54. As a user continues to slide cup holder 18 in direction 80, detent 70 moves against a bottom surface of second retainer engaging portion 44.

As a user moves cup holder 18 to the extended position shown in FIG. 7, detent 70 snaps into first opening or notch 46. In this position, detent 70 is adjacent edges 48, 50 of first opening 46. Also as shown in the extended position of FIG. 7, catch 72 is adjacent third engagement edge 54 of second opening 52. When cup holder 18 is in the extended position, as a user applies force in direction 80 to cup holder 18, detent 70 and stop surface 76 engage edge 48 and third engagement edge 54 respectively, inhibiting removal of cup holder 18 from base 16. As a user applies force in direction 82 to cup holder 18, detent 70 engages edge 50, inhibiting movement of cup holder 18 from the extended position toward the retracted position.

To insert cup holder 18 into base 16, a user inserts base connector 22 into cupholder receptor 38. As the user moves cup holder 18 toward the retracted position, catch 72 slides along an underside of base 16. Sloped surface 74 facilitates insertion of base connector 22 by the user by reducing resistance in sliding catch 72 past edge 50.

Base 16 includes left and right guide supports 120, 122. Each of guide supports 120, 122 includes a generally upwardly facing support surface 128. In operation, as shown in FIGS. 5–7, guides 110, 112 slide on support surface 128 thereby maintaining first portion 26 of cup holder 18 in the proper position to engage second portion 40 of base 16.

As shown in FIGS. 5–7, platform 90 illustratively provides additional support to cup holder 18 by supporting cup retainer 20 when cup holder 18 is in the retracted position, and by supporting at least a portion of cup receiver 20 or base connector 22 when cup holder 18 is between the retracted and extended positions. When cup holder 18 is in the extended position, platform 90 supports base connector 22. Platform 90 and container 92 are illustratively shaped so that the outer surface contours of cup holder 18 appear to continue the contours of the outer surfaces of platform 90 and container 92. These shapes provide the appearance that the cup holder 18 is an integral part of the base 16 when the cup holder 18 is in the retracted position.

Although this application has described detail with reference to certain preferred or illustrative embodiments, variations and modifications exist within the scope and spirit of the invention as described and defined in the following claims.

What is claimed is:

1. A juvenile vehicle seat assembly comprising a seat, a base removably attached and arranged to support the seat, a cupholder mounted for movement relative to the base between a retracted position and an extended position, a first element on the base, a second element on the cupholder, the first and second elements releasably locking the cupholder in a retracted position and yielding to allow the cupholder to travel to an extended position wherein it is releasably held by the first and second elements.

2. The assembly of claim 1, wherein at least one of the first and second elements includes an opening with an engagement surface and the other of the first and second elements includes a catch with a first portion adapted to engage the engagement surface to prevent movement of the cup holder beyond at least one of the retracted and extended positions.

3. The assembly of claim 2, wherein the catch further includes a second portion which is sloped to facilitate movement of the cup holder to the retracted position.

4. The assembly of claim 3, wherein the catch is coupled to a cantilevered tab.

5. The assembly of claim 1, wherein at least one of the first and second elements includes a detent having a first portion adapted to confront an engagement surface on the other of the first and second elements upon movement of the cupholder to the extended position.

6. The assembly of claim 5, wherein the detent has a second portion adapted to confront an engagement surface on the other of the first and second elements upon movement of the cupholder to the retracted position.

7. The assembly of claim 6, wherein the detent is coupled to a cantilevered tab.

8. A juvenile vehicle seat assembly comprising a seat, a base removably attached and arranged to support the seat, a cupholder mounted for movement relative to the seat between a first position and a second position, first and second elements connected to the base and cupholder, respectively, wherein the first and second elements are adapted to releasably lock the cupholder in the first position and to yield allowing the cupholder to travel to the second position wherein it is releasably held by the first and second elements.

9. The assembly of claim 8, wherein at least one of the first and second elements includes a catch the other of the first and second elements includes an opening with engagement surfaces wherein at least one of the first and second elements includes a detent having a first portion adapted to confront an engagement surface on the other of the first and second elements upon movement of the cupholder to the first position and a second portion adapted to confront an engagement surface on the other of the first and second elements upon movement of the cupholder to the second position.

10. The assembly of claim 9, wherein the other of the first and second elements includes a plurality of openings and engagement surfaces.

11. The assembly of claim 8, wherein at least one of the first and second elements includes a first detent portion adapted to confront an engagement surface on the other of the first and second elements upon movement of the cupholder to the first position and a second detent portion adapted to confront an engagement surface on the other of the first and second elements upon movement of the cupholder to the second position.

12. The juvenile vehicle seat of claim 11, wherein the cup holder includes a connecting member, the connecting member being movable relative to the base, and a cup receiver coupled to the connecting member to move therewith.

13. The juvenile vehicle seat of claim 12, wherein the cup holder is slidably mounted relative to the base.

14. A juvenile vehicle seat assembly comprising a seat, a base removably attached and arranged to support the seat, a cupholder adapted for movement between a retracted position and an extended position, and means for releasably locking the cupholder relative to the base in the retracted position and the extended position.

15. The assembly of claim 14 comprising a first element on the base, a second element on the cupholder, wherein
the means for releasably locking the cupholder includes the first and second elements.

\* \* \* \* \*